United States Patent [19]

Imahashi et al.

[11] 4,206,481

[45] Jun. 3, 1980

[54] DEFLECTING YOKE DEVICE

[75] Inventors: Fumio Imahashi; Kazuo Takahama, both of Yokohama; Masahiro Kurokawa, Tokyo; Takeshige Sannomiya, Kawasaki; Tadashi Abe, Yokohama, all of Japan

[73] Assignee: TokyoShibaura Electric Co., Ltd., Kawasaki, Japan

[21] Appl. No.: 870,527

[22] Filed: Jan. 18, 1978

[30] Foreign Application Priority Data

Jan. 19, 1977 [JP] Japan .................................... 77-4021
May 16, 1977 [JP] Japan .................................... 77-55409

[51] Int. Cl.$^2$ .............................................. H04N 5/645
[52] U.S. Cl. .............................................. 358/248; 335/213
[58] Field of Search .............................. 358/248; 335/213

[56] References Cited

U.S. PATENT DOCUMENTS 4,096,531 6/1978 Yamada .............................. 358/248

*Primary Examiner*—Howard W. Britton
*Attorney, Agent, or Firm*—Cushman, Darby & Cushman

[57] ABSTRACT

A front extended portion, a pair of facing extending segments, and a rear extended portion mounted on the extending segments, which compose a coil separator, are integrally molded. Saddle-type horizontal coil is inserted in a rear extended portion through an opening between the pair of facing extending segments. In this state the horizontal coil are fixed to the rear extended portion of the coil separator by means of spacers.

18 Claims, 21 Drawing Figures

FIG. 1
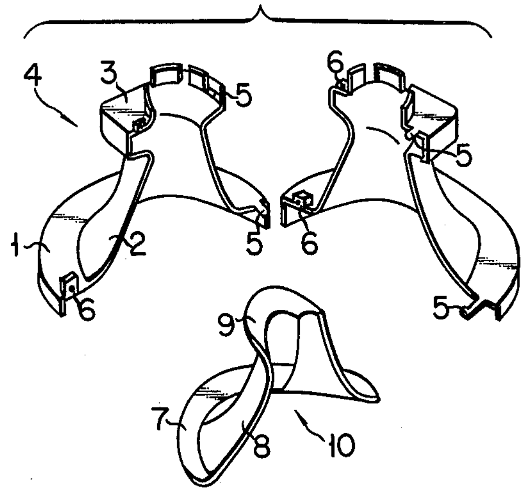
FIG. 2
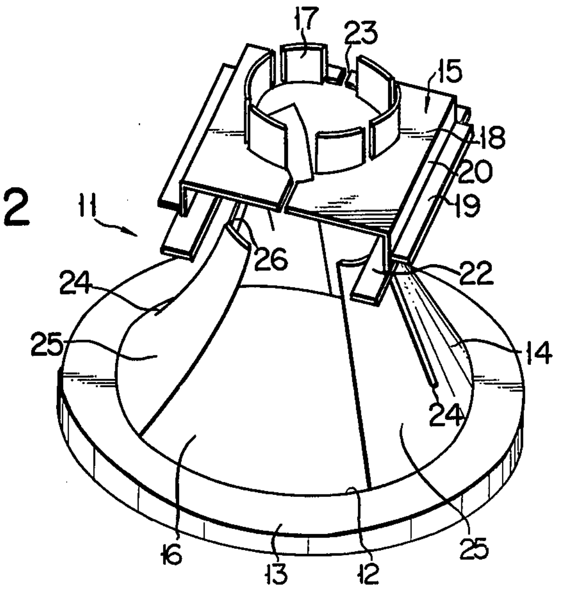
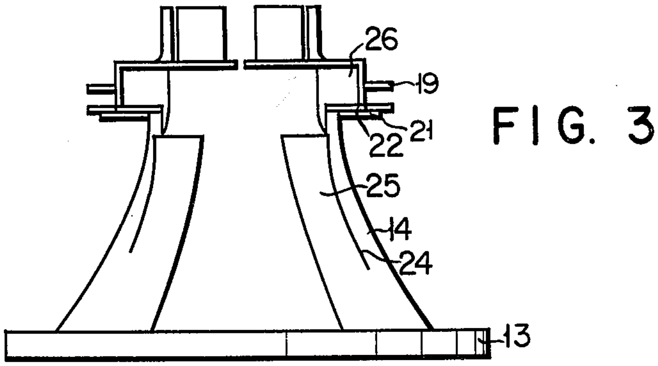
FIG. 3

FIG. 7
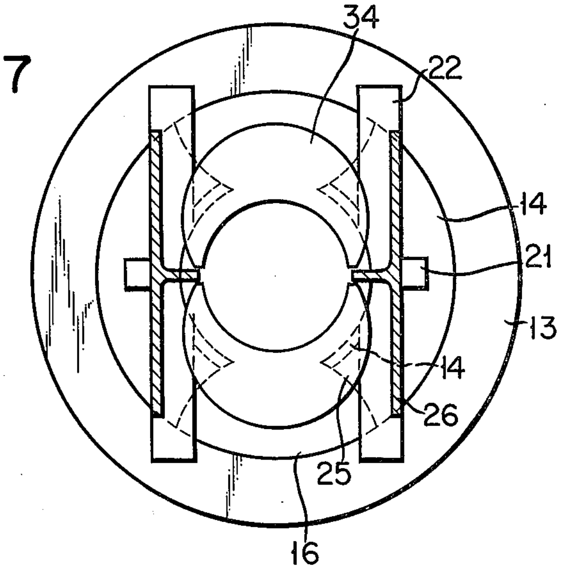
FIG. 8a
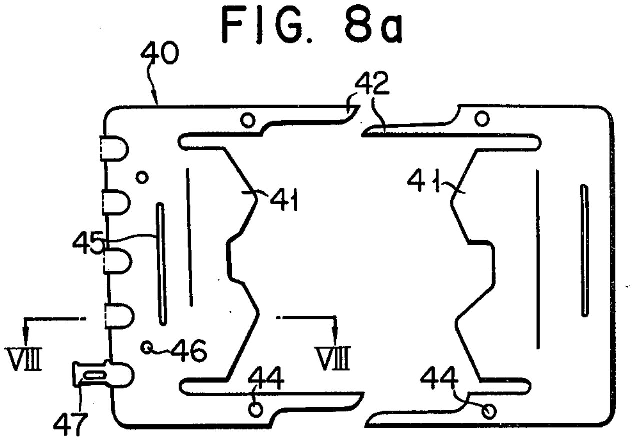
FIG. 8b
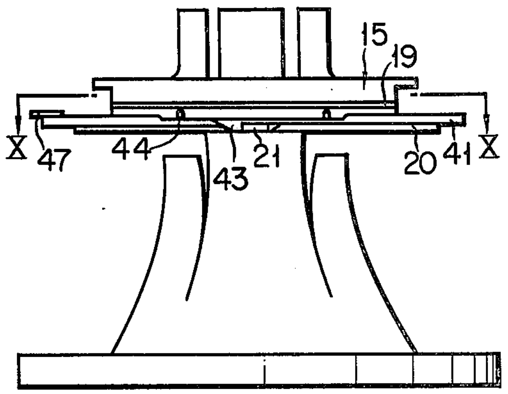
FIG. 9

FIG. 10
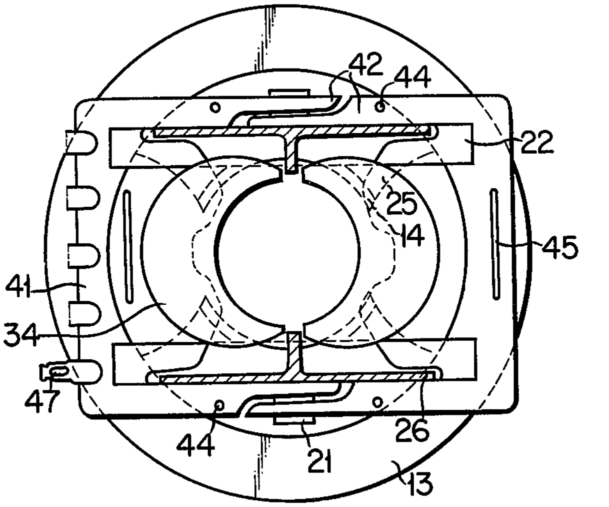
FIG. 11
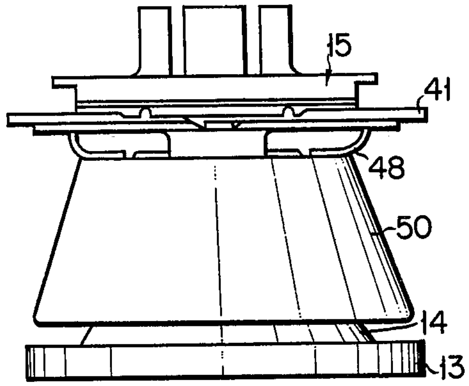
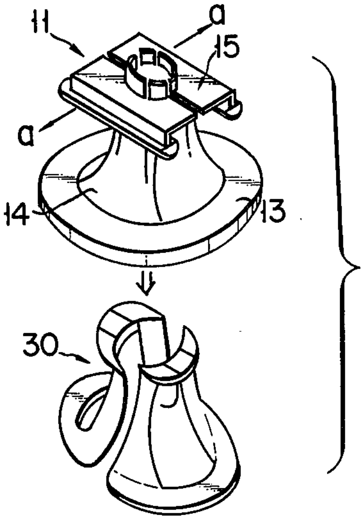
FIG. 12

DEFLECTING YOKE DEVICE

BACKGROUND OF THE INVENTION

This invention relates to a deflecting yoke device, more specifically to an integrally formed coil separator which may be used with TV sets and the like.

FIG. 1 shows a prior art deflecting yoke device. This type of deflecting yoke device consists of a pair of halved coil separators 4 each including a front extended portion 1, a conical barrel portion 2, and a rear extended portion 3; projections 5 formed at each one end of the front extended portion 1 and the rear extended portion 3 and sockets 6 formed at the other end so as to engage the halved coil separators with each other; a pair of saddle-type horizontal coils 10 each including a front edge portion 7, a side conductor group 8, and a rear edge portion 9. Thus, the deflecting yoke may be engagedly assembled by fitting the horizontal coil 10 in the coil separators 4 along the inner surface thereof so that the front extended portion 1, conical barrel portion 2 and rear extended portion 3 of each halved coil separator 4 are located correspondingly to the front edge portion 7, side conductor group 8, and rear edge portion 9 of each saddle-type horizontal coil 10, respectively, and the projections 5 are inserted in the sockets 6. Further, a vertical coil is put on the outer peripheral surface of the conical barrel portions 2 of the assembled coil separators 4. This vertical coil is formed of a pair of halved cylindrical cores with toroidally wound conductor.

Being of the aforementioned construction, the prior art coil separators must be so formed that the projections and sockets may be coupled tight to each other in order to secure the mechanical strength of the engaging portions that is, to avoid unsteadiness after assembly. Therefore, these types of coil separators have required at assembly a fixed substantial force and considerable skill as well as a lot of time, which has been an unfavorable factor to the processes for mass-production. Further, if any effective engagement should be obtained, their mechanical strength after the assembly would not be sufficient, and they would be subjected to totter by a small impact, failing to produce any significant effect on the delicate deflecting capability. Moreover, the axial dimensions are designed with allowance, taking account of the variations in the dimensions of the coil separators and horizontal coil as well as the assembling efficiency, so that there may be caused a fixed degree of axial looseness at assembly. Therefore, in order to eliminate such looseness, adhesives or adhesive tapes have been required to be applied between the horizontal coil and the coil separators for fixation, which would lead to the deterioration of the operating efficiency.

In general, these types of coil separators are molded out of thermoplastic resins with a fixed level or rigidity, such as polypropylene, polyphenylene oxide, etc. In molding such separated semicircular moldings out of these resins, there are liable to be caused molding distortions due to molding shrinkage and the like, which would lead to variations in the dimensions of the moldings. Thus, the positional relation between the horizontal and vertical coils attached to a pair of assembled coil separators would not be settled, causing substantial variations also in the performance as a deflecting yoke.

SUMMARY OF THE INVENTION

Accordingly, an object of this invention is to provide a deflecting yoke device assembled from an integrally formed coil separator.

BRIEF DESCRIPTION OF THE DRAWINGS

FIG. 1 is a perspective view of a partially disassembled prior art deflecting yoke device;

FIG. 2 is a perspective view of a coil separator of a deflecting yoke device according to a first embodiment of this invention;

FIG. 3 is a front view of the coil separator of FIG. 2;

Figure 5:
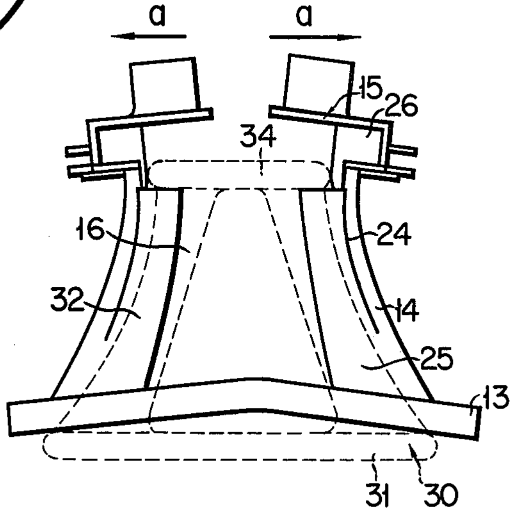
Figure 6:
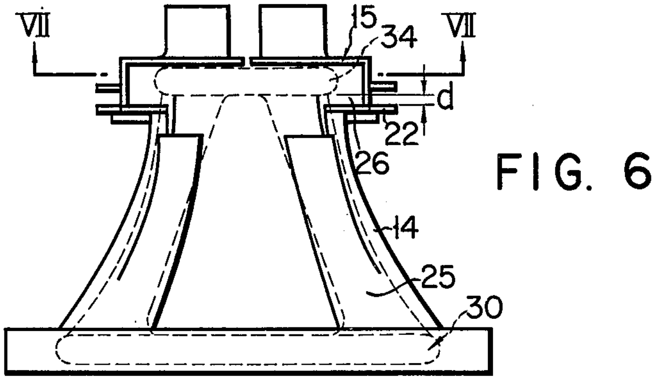

FIGS. **4*a* and 4*b*** are front and plan views of a saddle-type horizontal coil respectively;

FIGS. 5 and 6 are front views of the coil separator of the invention showing the setting of the saddle-type horizontal coil of FIG. **4*a*;**

FIG. 7 is a sectional view as taken along line VII—VII of FIG. 6;

FIG. **8*a*** is a plan view of the invention;

FIG. **8*b* is a sectional view as taken along line VIII—VIII of FIG. 8*a*;**

FIG. 9 is a side view of the coil separator fitted with the spacers of FIG. **8*a*;**

Figure 13:
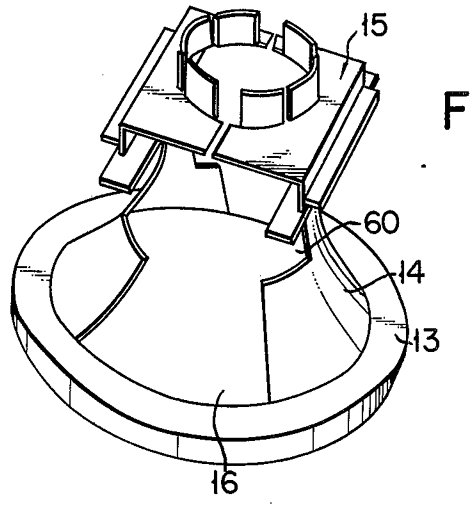
Figure 14:
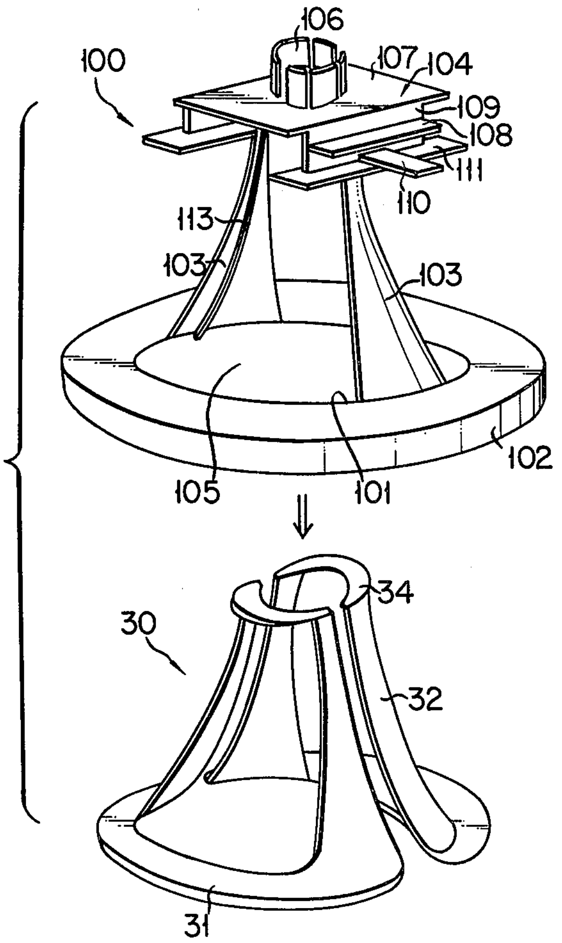
Figure 16:
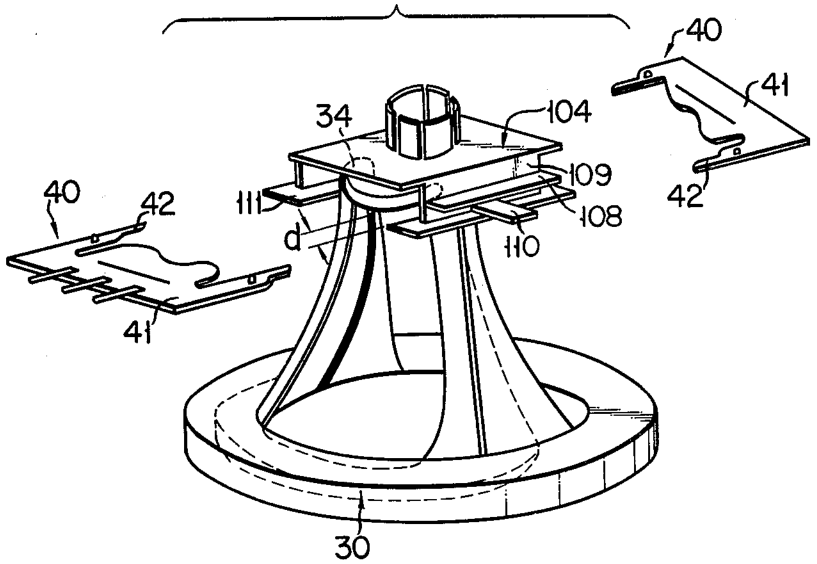
Figure 17:
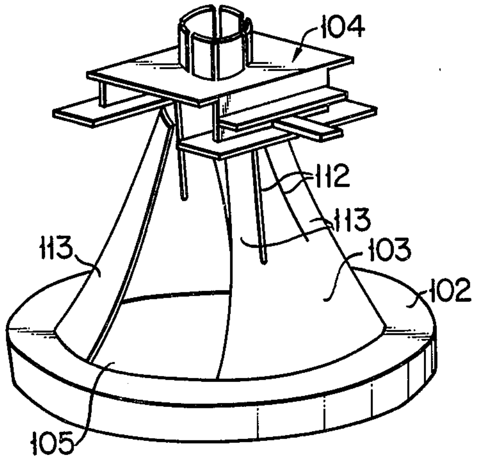

FIG. 10 is a sectional view as taken along line X—X of FIG. 9;

FIG. 11 is a side view similar to FIG. 9 showing a modification of the spacers;

FIG. 12 is a perspective view showing a step of attaching the coil separator to the saddle-type horizontal coil;

FIG. 13 is a perspective view of a modification of the coil separator;

FIG. 14 is a perspective view of a coil separator of a deflecting yoke device according to a second embodiment of the invention accompanied by the saddle-type horizontal coil;

FIGS. **15*a* and 15*b* are side front views of the coil separator of FIG. 14** respectively;

FIG. 16 is a perspective view showing a step of inserting the spacers in the saddle-type horizontal coil set in the coil separator;

FIG. 17 is a perspective view of a modification of the coil separator; and

Figure 18:
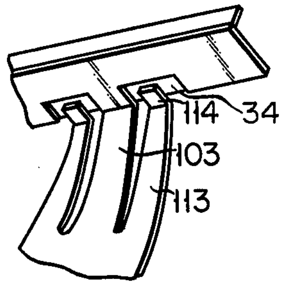

FIG. 18 is a partial enlarged perspective view of another modification of the coil separator.

DETAILED DESCRIPTION OF THE PREFERRED EMBODIMENTS

Now there will be described embodiments of this invention with reference to the accompanying drawings.

FIGS. 2 and 3 illustrate a coil separator 11 of the deflecting yoke device according to a first embodiment of the invention. This coil separator 11 is essentially composed of a front extended portion 13 with an aperture 12 in the center thereof, a pair of conical barrel portions 14 inwardly extending upward from the inner periphery of the aperture 12 of the front extended portion 13 and facing each other, and a rear extended portion 15 attached to the respective upper edges of the conical barrel portions 14. Opening 16 is defined by the regions of the respective side edges of the facing conical barrel portions 14 as well as by the regions from the inner periphery of the aperture 12 of the front extended portion 13. Each of the conical barrel portions 14 is semiconical upright segments serially integrated with the front extended portion 13. The rear extended portion 15 is attached to the upper edge of the semiconical upright segments. This rear extended portion 15, formed in the shape of a box that can house a rear edge portions of saddle-type horizontal coil as described hereinafter, is composed of a top plate 18 with a neck clamping cylindrical portion 17, side plates 20 each provided with a support plate 19 to support a fixing member for fixing the saddle-type horizontal coil to the coil separator, and bottom plates 22 each provided with a stopper 21 for engaging the fixing member. The top plate 18 has a gap 23 lengthwise passing through the center thereof, the gap 23 reaching opening 16 of the conical barrel portions 14. That is, the coil separator may be opened right and left along the opening 16 and the gap 23 communicating therewith. Meanwhile, the inside diameter of the conical barrel portions 14 is so determined that the rear edge portion 34 of the saddle-type horizontal coil as mentioned later may not be allowed to be directly inserted in the coil separator with the top plate be not opened. That is, the opening 16 is so formed that the rear edge portion of the saddle-type horizontal coil hits against the upper inner surfaces of the semiconical upright segments of the coil separator to be prevented from being inserted in the boxlike portion when the rear extended portion 15 of the coil separator is not opened right and left. Thus, if the rear edge portion of the horizontal coil would be once set in the boxlike portion, the horizontal coil will never drop on to the opening portion 16.

Meanwhile, the semiconical upright segments 14 are provided with hinge tongues 25 integrally formed on the outer sides thereof through slits 24 so that upper ends of the hinge tongues 25 is left as free ends. Further, each of the upright segments 14 is fitted with a projection 26 extending in the center from the front extended portion 13 to the rear extended portion 15, the projection 26 preventing a pair of separated saddle-type horizontal coil from coming into contact with each other.

The coil separator with such construction may be integrally injection-molded out of any thermoplastic resin with a fixed rigidity, such as polypropylene or polyphenylene oxide.

Figure 4A:
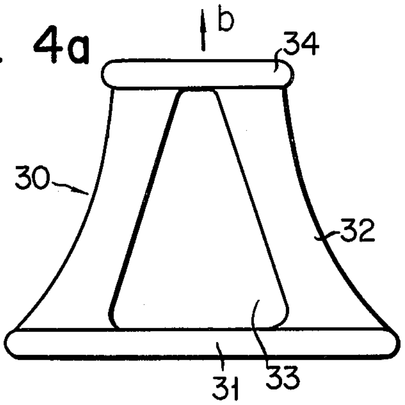
Figure 4B:
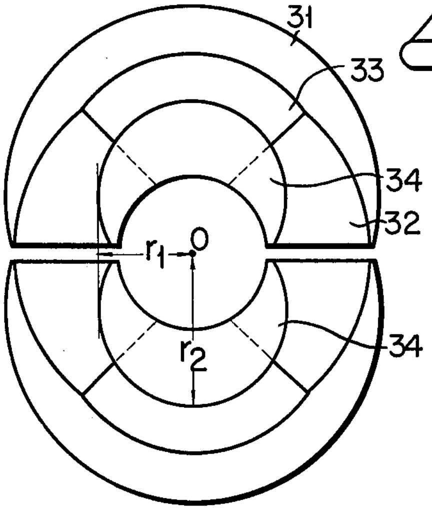

Meanwhile, as shown in FIG. 4*a*, saddle-type horizontal coil 30 is formed by a pair of coil member, which be the form of a truncated cone, is composed of a front edge portion 31, a side conductor group 32, a window portion 33, and a rear edge portion 34.

Referring now to FIGS. 4*a* to 6, there will be described the method for attaching the saddle-type horizontal coil to the coil separator of the invention.

In inserting the saddle-type horizontal coil 30 in the coil separator 11, the rear extended portion 15 of the coil separator is first opened right and left, as indicated by arrows a in FIG. 5, so that the space between the respective upper edges of the pair of facing semiconical barrel portions 14 becomes a little wider than the distance $r_1$ (FIG. 4*b*) between the tangent of rear edges 34 of the facing saddle-type horizontal coil and the center of the edges. On the other hand, the length $r_2$ from the center to the outer periphery of each of the rear edges 34 is extending to be housed within the rear extended portion without any hindrances in insertion of the horizontal coil. In this state, when the saddle-type coil 30 is inserted from the direction as indicated by arrow b of FIG. 4*a*, the extended portion of the horizontal coil may easily be introduced into the boxlike portion of the rear extended portion 15 without any interference. At that time, the tongues 25 of the coil separator are widened by the insertion of the outer peripheries of the rear edge portions 34 of the horizontal coil. Thus, the front edge portion 31, side conductor group 32, and rear edge portion 34 of the saddle-type horizontal coil 30 are set in contact with the front extended portion 13, inner surface of the semiconical barrel portion 14, and rear extended portion 15 of the coil separator, respectively.

When the horizontal coil is thus attached to the coil separator, if the width of the opening 16 is excessively larger than that of the window portion 33 of the horizontal coil, the side conductor group 32 of the horizontal coil will project out from the width of the opening 16 to be exposed to the outside, thereby coming into contact with a vertical toroidal coil attached to the outer peripheral surface of the coil separator to lose its insulation. Therefore, the width of the opening 16 is preferably smaller than that of the window portion 33 of the horizontal coil 30. The tongues 25 have an additional function to prevent the contact between the horizontal coil and the vertical coil.

FIGS. 6 and 7 show drawings in which the saddle-type horizontal coil is attached to the coil separator. As shown in these drawings, a gap d is formed between the rear edge portion 34 of the saddle-type horizontal coil 30 and each bottom plate of the boxlike portion of the rear extended portion 15. The saddle-type horizontal coil 30 is fixed to the coil separator by inserting a pair of spacers 40 as shown in FIG. 8*a* into the gap d.

Each of spacers 40 is composed of body portions 41 to hold the coil separators and having tapered tip end to be inserted into the gap d, legs 42 with a fluke 43 protruding from each end of the body portions 41 and holding the rear extended portion 15 from both sides thereof to prevent the splitted coil separator from spreading out; projections 44 formed on the legs; partition walls 45 formed on the body portions and guide pins 46 for lead wire. Each two corresponding legs 42 of the spacers are so formed that the inner periphery of one leg may be engaged with the outer periphery of the other leg. In insertion the projections 44 are pressed by the support plates 19 attached to the side walls of the boxlike portion, the flukes 43 formed at the tip ends of the legs 42 engaged with the stoppers 21, and thus the spacers are fixed (FIGS. 9 and 10). Further, the rear edge of one of these spacers 40 is provided with a terminal fitting 47, which is to be used as a terminal strip for drawing out the lead wire of the deflecting coil. These spacers 40 may be provided also with elastic tongues 48 integrally extending downward from the body portions 41, as shown in FIG. 11. The elastic tongues 48 are helpful in fixing a vertical toroidal coil 50. FIG. 12 shows a state in which the coil separator is to be opened in the direction as indicated by arrows a for insertion of the horizontal coil.

Although in this embodiment the semiconical upright segments 14 are provided with the tongues for facilitating the insertion of the saddle-type coil and retaining the insulation of the external surface of the saddle-type coil, the insertion of the coil may be facilitated also by forming large notches 60, as shown in FIG. 13, which are integrated with the opening 16, for example. In this case, however, the side conductor group 32 of the saddle-type coil is exposed from the coil separator, so that the same effect as that in the aforesaid embodiment may be obtained only by taking account of the insulation of the conductor group 32 from the toroidal coil attached to the outer surface of the coil separator.

In the aforementioned deflecting yoke device according to the first embodiment of the invention, the rear extended portion of the coil separator may be opened wide, so that the saddle-type horizontal coil can easily be inserted in the coil separator from the front extended portion thereof. Further, by using a jig or the like, the coil separator may be put from above the saddle-type horizontal coil located properly while opening the coil separator in the direction as indicated by arrows a, thereby allowing the coil to be at the same time inserted in the coil separator, as shown in FIG. 12, for example. Consequently, the efficiency of assembly may substantially be improved, and besides automatic assembly can be realized.

Now there will be described a coil separator of the deflecting yoke device according to a second embodiment of the invention.

Figure 15A:
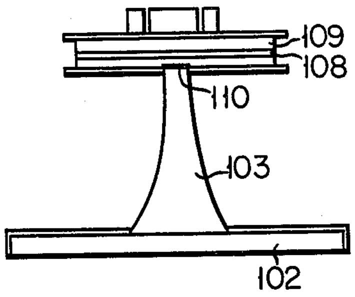
Figure 15B:
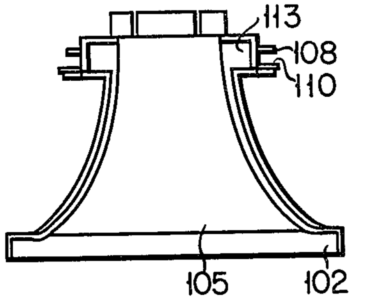

Referring now to FIGS. 14, 15*a* and 15*b*, this coil separator 100 is essentially composed of a front extended portion 102 with an aperture 101 in the center thereof, a pair of triangular upright segments 103 diminishingly extending upward from the inner periphery of the aperture 101 of the front extended portion 102, and a rear extended portion 104 bridging the upper ends of the pair of upright segments. Between the respectively corresponding side edges of the facing upright segments 103 there is defined opening 105 extending from the inner periphery of the aperture 101 of the front extended portion 102 to the rear extended portion 104. The opening 105 is of such size that allows the saddle-type horizontal coil to be inserted in the rear extended portion of the coil separator without hitting the upright segments 103 on the rear edge portions. Further, the rear extended portion 104, formed in the shape of a box, is composed of a top plate 107 bridging the upper ends of the facing upright segments 103 and having a neck clamping cylindrical portion 106, side plates 109 each provided with a support plate 108 support a fixing member, and bottom plates 111 each provided with a stopper 110 for the fixing member. The inside diameter of the upper ends of the upright segments 102 is so determined as to allow the rear edge portion of the saddle-type horizontal coil to be freely inserted. Further, like the aforesaid embodiment, each of the upright segments 103 is provided in the center thereof with a projection 113 for separating the horizontal coil from each other.

The coil separator with such construction may be integrally injection-molded out of any thermoplastic resin with a fixed rigidity, such as polypropylene or polyphenylene oxide.

Since the construction of the saddle-type horizontal coil is the same as the aforesaid one, the same parts will be denoted by like reference numeral and excluded from the following detailed description.

In this embodiment the rear edge portion of the saddle-type horizontal coil is formed to reach the top plate 107 from the inside of the facing upright segments 103 of the coil separator through the space between the bottom plates 109 of the rear extended portion, so that the horizontal coil is attached to the coil separator by disposing the coil separator above the horizontal coil so as to bring the rear edge portions 34 of the horizontal coil in alignment with the opening of the coil separator, as shown in FIG. 14, and then lowering the coil separator in the direction as indicated by the arrow in FIG. 14, thereby putting the coil separator on the horizontal coil. Thus, the rear edge portion 34 of the horizontal coil is fitted in the boxlike portion through the opening 105 of the coil separator, while the front edge portion 31 is brought in contact with the inner peripheral surface of the front extended portion 102 of the coil separator as shown in FIG. 16.

In this state, however, the saddle-type horizontal coil may come off the separator, so there are used spacers to prevent this. That is, a pair of spacers are pushed from the right and left of the side plates 109 of the rear extended portion 104 into the gap d formed between the bottom plates 111 of the boxlike portion of the rear extended portion 104 and the rear edge portion 34 of the horizontal coil to firmly fix as shown in FIG. 16.

In this embodiment the construction of the spacers 40 for fixing the horizontal coil to the coil separator is the same as that of the spacers used in the first embodiment, so that the description of such construction will be omitted hereinafter.

According to the embodiment as illustrated in FIG. 14, the side conductor group 32 is exposed from the coil separator because of the widened opening 105, so there may not be kept the insulation between the conductor group 32 and a vertical toroidal coil attached to the outer surface of the coil separator. Therefore, in such a case, the insulation between the horizontal coil and the vertical coil may be retained by forming tongues 113 on both side edges of the respective upright segments 103 through slits 112, as shown in FIG. 17. These tongues will never be a hindrance to the insertion of the horizontal coil into the coil separator.

Further, bent portions 114, which are formed by bending the top ends of the tongues in the shape of L as shown in FIG. 18, will be restrained by the rear edge portion 34 of the horizontal coil when the horizontal coil is attached to the coil separator. Thus, the horizontal coil may be prevented from coming off the coil separator.

According to the deflecting yoke device with the above-mentioned construction, the saddle-type horizontal coil may easily be inserted from the front extended portion. Further, by using a jig or the like, the coil separator may be lowered in the direction as indicated by the arrow and simultaneously put on the pair of horizontal coil disposed facing each other. Therefore, the efficiency of assembly may substantially be improved, and besides automatic assembly can be realized.

Thus, the integrally molded coil separators of the first and second embodiments of the invention may provide several advantages over the conventional coil separator which is formed by engagedly combining a pair of segments. That is, the integrally formed coil separator can ensure substantially reduced production cost and reluctance to molding deformation or distortion, as well as improved stability in dimensions which would reduce looseness. In addition, increase in the overall rigidity will retain the fixed positional relation between the coils, thus securing the improvement of performance as deflecting yoke devices.

Furthermore, the axial fixation of a saddle-type coil may easily be achieved by the insertion of a single spacer, and the concurrent use of the spacer as a wiring terminal strip will widen the range of functions, thereby curtailing the number of parts or components used.

What we claim is:

1. A deflecting yoke device comprising a saddle-type horizontal coil; an integrally formed coil separator provided with a front extended portion having in the center thereof an aperture for insertion of said horizontal coil, a pair of extending segments inwardly extending upward from the inner periphery of said aperture of the front extended portion and facing each other, the respective side edges of said extending segments defining an opening in communication with the inner periphery of said front extended portion, and a rear extended portion extending from the facing upper edges of said extending segments toward the respective opposite edges and formed to hold the rear edge portions of said horizontal coil; and a fixing member for fixing said horizontal coil inserted in said rear extended portion thereof.

2. A deflecting yoke device according to claim 1, wherein said coil separator is integrally molded out of any thermoplastic resin with a fixed rigidity.

3. A deflecting yoke device according to claim 2, wherein each of said extending segments is formed into a semiconical upright segment and is provided with a separating projection axially extending in the center for separating a pair of facing saddle-type horizontal coils.

4. A deflecting yoke device according to claim 3, wherein each of said extending segments has hinge tongues integrally formed on the outer sides thereof toward said openings through slits the upper end portions of said tongues being left as free ends.

5. A deflecting yoke device according to claim 3, wherein a notch is formed on each of side edges of each said semiconical upright segment.

6. A deflecting yoke device according to claim 2, wherein each of said extending segments is formed into a triangular upright segment and is provided with a separating projection axially extending in the center for separating a pair of facing saddle-type horizontal coils.

7. A deflecting yoke device according to claim 6, wherein each of said extending segment has hinge tongues integrally formed on the outer sides thereof toward said openings through slits, the upper end portions of said tongues being left as free ends.

8. A deflecting yoke device according to claim 7, wherein the upper ends of said hinge tongues are provided with L-shaped bent portions which restrain the rear edge portion of said saddle-type horizontal coil when said horizontal coil are inserted in said coil separator, thereby preventing said horizontal coil from coming off said coil separator.

9. A deflecting yoke device according to claim 2, wherein said opening defined between the respective side edges of said pair of facing extending segments are of such size that causes the rear edge portion of said saddle-type horizontal coil to hit against the inside of the facing extending segments of said coil separator when said horizontal coil is inserted into said coil separator.

10. A deflecting yoke device according to claim 2, wherein said opening defined between the respective side edges of said pair of facing extending segments is of such size that allows the rear edge portion of said saddle-type horizontal coil to be smoothly inserted into a boxlike portion through a space between facing bottom plates of said rear extended portion without hitting against the inside of the facing extending segments of said coil separator when said horizontal coil is inserted into said coil separator.

11. A deflecting yoke device according to claim 2, wherein said rear extended portion, formed of a boxlike portion extending outward from the top edges of said opening, includes a top plate with a neck clamping cylindrical portion, facing side plates each fitted with a support plate for supporting said fixing member, and facing bottom plates each provided with a stopper for engaging said fixing member.

12. A deflecting yoke device according to claim 11, wherein said opening is so formed that the rear edge portion of said saddle-type horizontal coil hits against the inside of the facing extending segments of said coil separator when said horizontal coil is inserted into said coil separator, and the top plate of said rear extended portion is slitted by a gap connected with said opening.

13. A deflecting yoke device according to claim 11, wherein said opening is so formed that the rear edge portion of said saddle-type horizontal coil may be smoothly inserted into the boxlike portion of said rear extended portion without hitting against the inside of the facing extending segments of said coil separator when said horizontal coil is inserted into said coil separator, and the top plate of said rear extended portion bridges said facing side plates.

14. A deflecting yoke device according to claim 2, wherein said fixing member is a pair of spacers with tapered tip end, each provided with a partition wall.

15. A deflecting yoke device according to claim 14, wherein one of said spacers is provided with lead wire guide pins and a terminal fitting at the rear end.

16. A deflecting yoke device according to claim 14, wherein said spacers are provided with holding members extending from both sides thereof for holding said rear extended portion to prevent the separated coil separator from spreading out.

17. A deflecting yoke device according to claim 16, wherein said holding members are provided with flukes at the tip ends and projections to hit against the support plates of said boxlike portion.

18. A deflecting yoke device according to claim 14, wherein said spacers are fitted with elastic tongues extending downward for fixing a vertical toroidal coil attached to the periphery of said extending segments.

* * * * *